United States Patent
Mohapatra

(10) Patent No.: US 9,934,316 B2
(45) Date of Patent: Apr. 3, 2018

(54) CONTEXTUAL SEARCH ON DIGITAL IMAGES

(75) Inventor: Siddhartha Mohapatra, San Jose, CA (US)

(73) Assignee: OATH INC., New York, NY (US)

( * ) Notice: Subject to any disclaimer, the term of this patent is extended or adjusted under 35 U.S.C. 154(b) by 21 days.

(21) Appl. No.: 13/281,440

(22) Filed: Oct. 26, 2011

(65) Prior Publication Data
US 2013/0110814 A1    May 2, 2013

(51) Int. Cl.
*G06F 7/00* (2006.01)
*G06F 17/30* (2006.01)

(52) U.S. Cl.
CPC .............................. *G06F 17/30873* (2013.01)

(58) Field of Classification Search
CPC ................................................ G06F 17/30873
USPC .......................................................... 707/767
See application file for complete search history.

(56) References Cited

U.S. PATENT DOCUMENTS

| | | | | |
|---|---|---|---|---|
| 2003/0112267 A1* | 6/2003 | Belrose | ................... | G06F 3/038 715/728 |
| 2004/0017404 A1* | 1/2004 | Schileru-Key | ...... | G06F 3/04815 715/854 |
| 2008/0126191 A1* | 5/2008 | Schiavi | ................... | G06Q 30/02 705/14.56 |
| 2008/0201734 A1* | 8/2008 | Lyon | ................... | G06Q 30/0251 725/34 |
| 2010/0057675 A1* | 3/2010 | White | ..................... | G06Q 30/02 707/E17.108 |
| 2010/0070484 A1* | 3/2010 | Kraft | ................. | G06F 17/30867 707/706 |
| 2010/0162164 A1* | 6/2010 | Kwon et al. | .................. | 715/803 |
| 2011/0016376 A1* | 1/2011 | Hinson | ............. | G06F 17/30899 715/205 |

* cited by examiner

*Primary Examiner* — Van H Oberly
(74) *Attorney, Agent, or Firm* — James J. DeCarlo; Greenberg Traurig, LLP

(57) ABSTRACT

A computer-implemented method of providing contextual search on digital images includes tracking a plurality of movements of a user over one or more hot-spots on a digital image in response to the user viewing a web page. The computer-implemented method also includes receiving a selected hot-spot from the user. Further, the computer-implemented method includes displaying a pop-up on the selected hot-spot. The pop-up includes a search query and search results on the hot-spot. Moreover, the computer-implemented method includes providing relevant context to the user corresponding to the search query.

18 Claims, 7 Drawing Sheets

CONTEXTUAL SEARCH ON DIGITAL IMAGES

TECHNICAL FIELD

Embodiments of the disclosure relate generally, to contextual search and more specifically, to provide additional information and advertisements on digital images to a user.

BACKGROUND

Today, web browsing is a major activity performed by a user to view information. Often, the user may want to retrieve additional information related to a particular text article on a web page that the user is browsing. In order to retrieve the additional information, contextual searches are performed by allowing the user to input a search query to retrieve the additional information. Similarly, searches are performed to display contextual advertisements to the user based on keywords in the search query. Typically, the contextual searches and contextual advertisements are directed towards specific text displayed on the web page. Further, the keywords in the search query need to be specific to retrieve search results. In addition, it is observed that contextual search query volume is less. Consequently, click through rate (CTR) of the contextual search and the contextual advertisements are low.

A similar approach of contextual searches is performed over images. However, the additional information of images displayed to the user is found only on an image caption. Traditional techniques involves in annotating images. The annotated images allow the additional information to be associated with a particular point in the images. Further, annotating images establishes image-tagging where relevant advertisements are displayed on highlighted portions of the images. However, in many cases, accurately identifying the content of the annotated images requires human intervention. Moreover, in the traditional techniques, insufficient information is provided to the user. The CTR is low in the above techniques and hence monetization is on a lower side.

In light of the foregoing discussion, there is a need for an efficient method and system for providing contextual search on digital images to the user.

SUMMARY

The above-mentioned needs are met by a computer-implemented method, system, and computer program product for providing contextual search on digital images.

An example of a computer-implemented method for providing contextual search on digital images includes tracking a plurality of movements of a user over one or more hot-spots on a digital image in response to the user viewing a web page. The computer-implemented method also includes receiving a selected hot-spot from the user. Further, the computer-implemented method includes displaying a pop-up on the selected hot-spot. The pop-up includes a search query and search results on the hot-spot. Moreover, the computer-implemented method includes providing relevant context corresponding to the search query to the user.

An example of a computer program product stored on a non-transitory computer-readable medium that when executed by a processor, performs a method for providing contextual search on digital images includes tracking a plurality of movements of a user over one or more hot-spots on an digital image in response to the user viewing a web page. The computer program product also includes receiving a selected hot-spot from the user. Further, the computer program product includes displaying a pop-up on the selected hot-spot. The pop-up includes a search query and search results on the hot-spot. Moreover, the computer program product includes providing relevant context corresponding to the search query to the user An example of a system for providing contextual search on digital images includes a web interface to receive one or more hot-spots selected by a user. The system also includes a tracker, coupled in communication with the web interface, to track movements of the user over the one or more hot-spots on a digital image in response to the user viewing a web page. Further, the system includes a search engine, communicatively coupled to the web interface, to provide relevant context in response to receiving a search query from the user. Moreover, the system includes an advertisement selection engine, communicatively coupled to the web interface, to select one or more advertisements based on the one or more hot-spots selected by the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

A computer-implemented method, system, and computer program product for providing contextual search on digital images to a user is disclosed. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
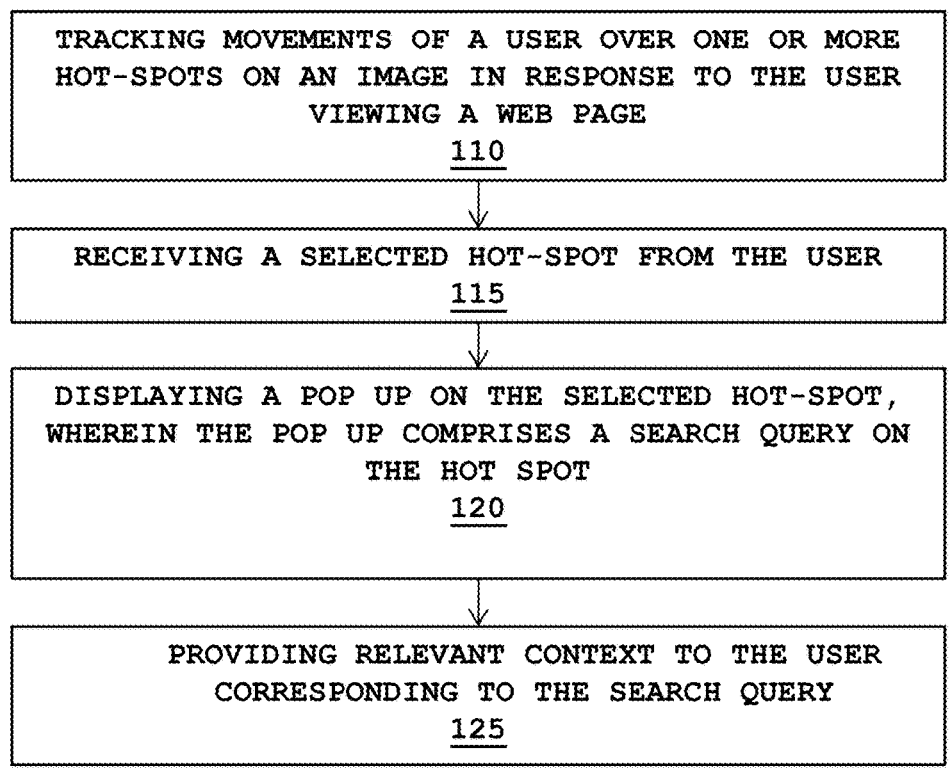
FIG. 1 is a flow diagram illustrating a method of providing contextual search on digital images to a user, in accordance with one embodiment.

FIG. 1 is a flow diagram illustrating a method of providing contextual search on digital images to a user, in accordance with one embodiment.

At step 110, movements of a user over one or more hot-spots on a digital image are tracked, in response to the user viewing a web page.

The movements of a user are tracked in response to the user browsing the web page. The web page can include textual information, digital images, video and other digital assets. The digital images are typically annotated by assigning metadata in a form of captions or keywords to the digital images.

Further, the digital images include one or more hot-spots. The hot-spots can be defined as a set of pixels selected on the digital image which includes a geometric specification. For example, x and y coordinates of a center of a circle and a radius(r) of the circle or a polygon representing irregular shaped hot-spots. Typically hot-spots are defined by an editor at a time of publishing the web page. Further, the digital image can have a single hot-spot or multiple hot-spots primarily defined by the editor. For example, consider an image of Sachin Tendulkar holding a cricket bat. The entire image can be defined as a single hot-spot or selected portions of the image, for example the cricket bat, a cap worn by Sachin Tendulkar, an Adidas logo on the Tshirt and so on can be defined as the multiple hot-spots.

In one embodiment, one or more portions of the digital images can be manually selected as corresponding hot-spots.

The hot-spots to be defined on the digital image are selected. Further, the hot-spots are tagged with the meta data commonly referred to as "meta tagging". Typically, the meta data includes search terms and advertisements. The search terms are used to retrieve relevant context to the user. Similarly, the advertisements include the associated URLs of the advertisements. Further, the meta data is stored in a storage unit.

The user hovers over the hot-spots on the digital image. The hovering movements of the user are tracked by various gestures. The gestures include, but are not limited to, mouse movements over the hot-spots, pen based gestures and touch based gestures.

At step 115, a selected hot-spot is received from the user. The user can select a desired hot-spot by any of the gestures. For example, the user can select the Adidas logo by clicking the mouse of a computer device.

In one embodiment, the user can select a hot-spot corresponding to a video displayed on the web page. In this case, the video is considered as a frame of images. Each frame is meta-tagged with contextual data.

In another embodiment, the selected hot-spot can be subjected to further analysis to retrieve contextual information. Examples of the analysis include, but are not limited to, running through facial recognition software, Optical Character Recognition (OCR) scanning and image scanning software.

At step 120, a pop-up is displayed on the selected hot-spot. The pop-up includes a search query on the hot-spot. Further, the pop-up also includes search results and contextual advertisements corresponding to the search query. The search results can also include recommendations (for example, Facebook "likes", Google+1) derived from social networks of the user. In one embodiment, the pop-up can also suggest similar search terms for the search query.

The pop-up is a small graphical user interface (GUI) and allows the user to change the search query. The search query includes a search term or a set of keywords. Based on the search query, additional information about the selected hot-spot is retrieved. For example, on selecting Adidas logo as the selected hot-spot, the user views "Sports shoes" in the search query. The term "Sports shoes" is extracted from the meta data corresponding to the selected hot-spot.

Further, the meta data of the selected hot-spot can be retrieved from a database. The meta data comprises the search term associated with the search query and multiple universal resource locators (URLs) associated with the advertisements.

At step 125, relevant context corresponding to the search query is provided to the user.

The additional information is retrieved from a database and provided to the user as the relevant context corresponding to the search query.

In one embodiment, relevant advertisements are also displayed to the user. The URLs tagged with the hot-spot are used to retrieve corresponding advertisements to the user. The user can interact with the advertisements. Consequently, click through rate (CTR) is increased.

The user can view the relevant context and the relevant advertisements displayed. The user is provided with additional information about the selected hot-spot in the annotated image.

Figure 2:
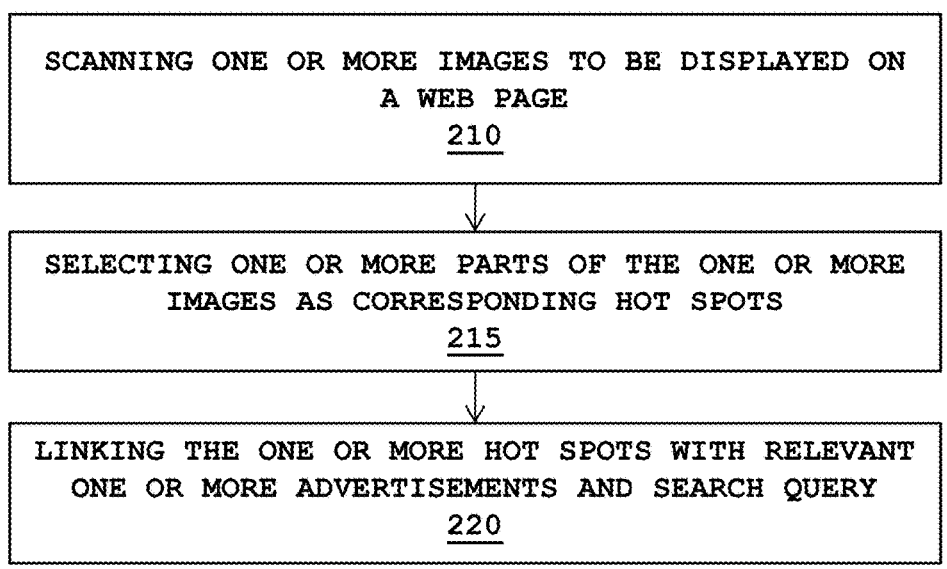
FIG. 2 is a flow diagram illustrating a method of linking annotated images with a plurality of advertisements and a search query, in accordance with one embodiment.

FIG. 2 is a flow diagram illustrating a method of linking annotated images with a plurality of images and advertisements, in accordance with one embodiment.

At step 210, one or more images to be displayed on a web page are scanned for specific features. The specific features include, but are not limited to, facial features, clothes, devices, ornaments and other meta information for example geo-tagging.

At step 215, one or more parts of the one or more images are selected as corresponding hot-spots. Further, the specific features can be selected as the hot-spots.

In one embodiment, the annotated image can be considered as a single hot-spot.

At step 220, the one or more hot-spots are linked with relevant advertisements and a search query.

Further, the hot-spots are linked with corresponding advertisements. Similarly, search terms in the search query are also linked with the hot-spots.

In one embodiment, the one or more hot-spots are linked with one or more keywords. The one or more keywords can then be resolved to search query results and advertisements.

Figure 3:
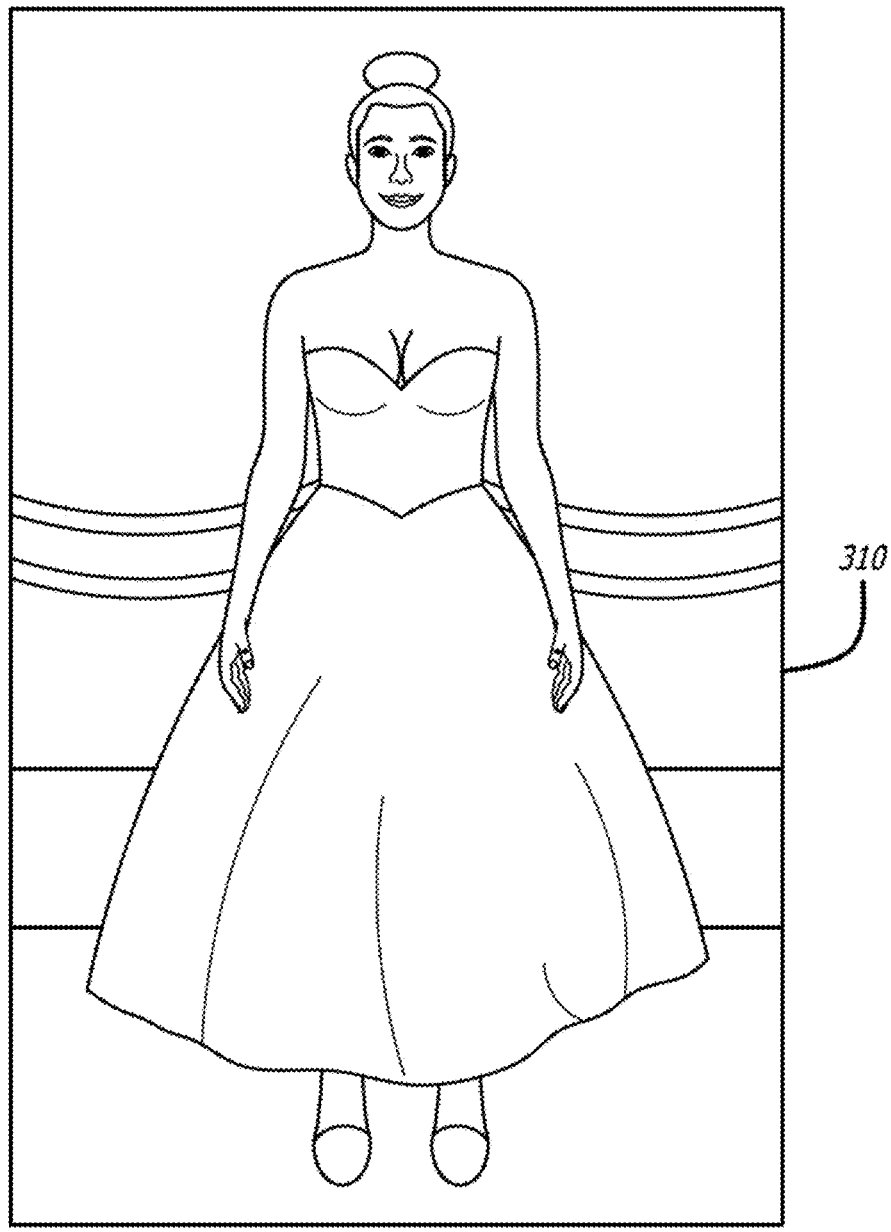
FIG. 3 is an exemplary representation of providing contextual search on digital images, in accordance with one embodiment.

FIG. 3 is an exemplary representation of providing contextual search on annotated images, in accordance with one embodiment.

Consider a user browsing internet and views a web page. The web page includes an image 310 of a lady. The user is interested in the dress that the lady wears and desires for more information or advertisements related to the dress. At this point of time, the user hovers over the image by a gesture, for example, moving the mouse pointer over the image. A pop-up is displayed with contextual search results and advertisements. In one embodiment, the user can input a search query, for example, "brand of dress". In response to the input, the user is then provided with additional information, for example, the name of the brand, and other related products of the brand and so on. The additional information can be displayed on a new web page. The user can further input other search queries to view more information until satisfaction.

In one embodiment, relevant advertisements associated with the dress are displayed to the user. The user can then interact with the advertisements. For example, the user can purchase the dress.

Figure 4:
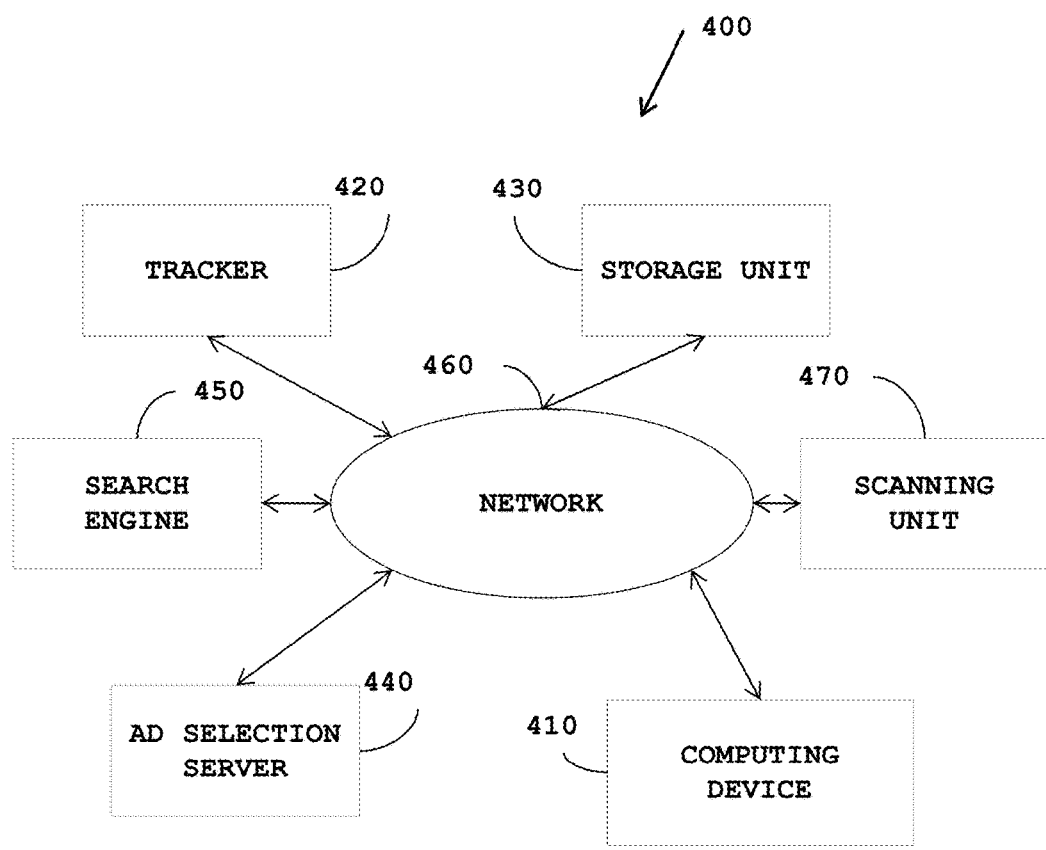
FIG. 4 is a block diagram illustrating a system for providing contextual search on digital images to a user, in accordance with one embodiment.

FIG. 4 is a block diagram illustrating a system for providing contextual search on digital images to a user, in accordance with one embodiment. The system 400 can implement methods described above. The system 400 includes a computing device 410, a tracker 420, a storage unit 430, an ad selection server 440, a search engine 450, and a scanning unit 470 in communication with a network 460 (for example, the Internet or a cellular network).

The computing device 410 can be, for example, a Personal Computer(PC), a stationary computing device, a laptop or notebook computer, a tablet computer, a smart phone or Personal Digital Assistant (PDA), a smart appliance, a video gaming console, an Internet television, a set-top box, or other suitable processor-based devices that can send and view advertisements and contextual search results. In one embodiment, the computing device 410 displays additional information of an image in response to a user selecting the image or a hot-spot of the image. Additional embodiments of the computing device 410 are described in detail in conjunction with FIG. 5.

The tracker 420 tracks the movements of the user over one or more hot-spots on an annotated image in response to the user viewing a web page. The movements are a gesture made by the user on the computing device 420. Examples of the gesture include, but are not limited to, mouse movements, pen based movements and touch based movements.

The storage unit 430, in one embodiment, stores metadata of the hot-spots and interfaces with the ad selection server 440. The metadata includes search terms and URLs of multiple advertisements. Examples of the storage unit include, but are not limited to, a database, a Grid, a table like Yahoo Query Language (YQL) and a Content Management System (CMS) or Content Delivery Network (CDN) used for images. The YQL maps the meta data with URLs associated with the images. The storage unit typically receives a keyword, image ID or the URL as the input and provides the results of the search query and advertisements as the output.

The ad selection server 440 selects advertisements and web pages based on the hot-spot that the user is interested in. The selected advertisements and the web pages are then targeted to the user.

The search engine 450 provides relevant context in response to receiving a search query from the user. Further, the search engine 450 provides recommendations derived from social networks of the user.

Further, the computing device 410 receives one or more hot-spots selected by a user through a web interface. The web interface displays a pop-up on the selected hot-spot. At this point of time, the user can either input a search query in the pop-up or can choose to view relevant advertisements on the hot-spot. Consequently, the metadata of the selected hot-spot is retrieved from the storage unit 430.

Further, the system 400 includes a scanning unit 470. The scanning unit 470 scans one or more annotated images to be displayed on the web page. On completion of scanning, the scanning unit 470 selects one or more portions of the annotated images as corresponding hot-spots.

In some embodiments, the tracker 420, the storage unit 430 and the scanning unit 470 can be located in the computing device 410.

Figure 5:
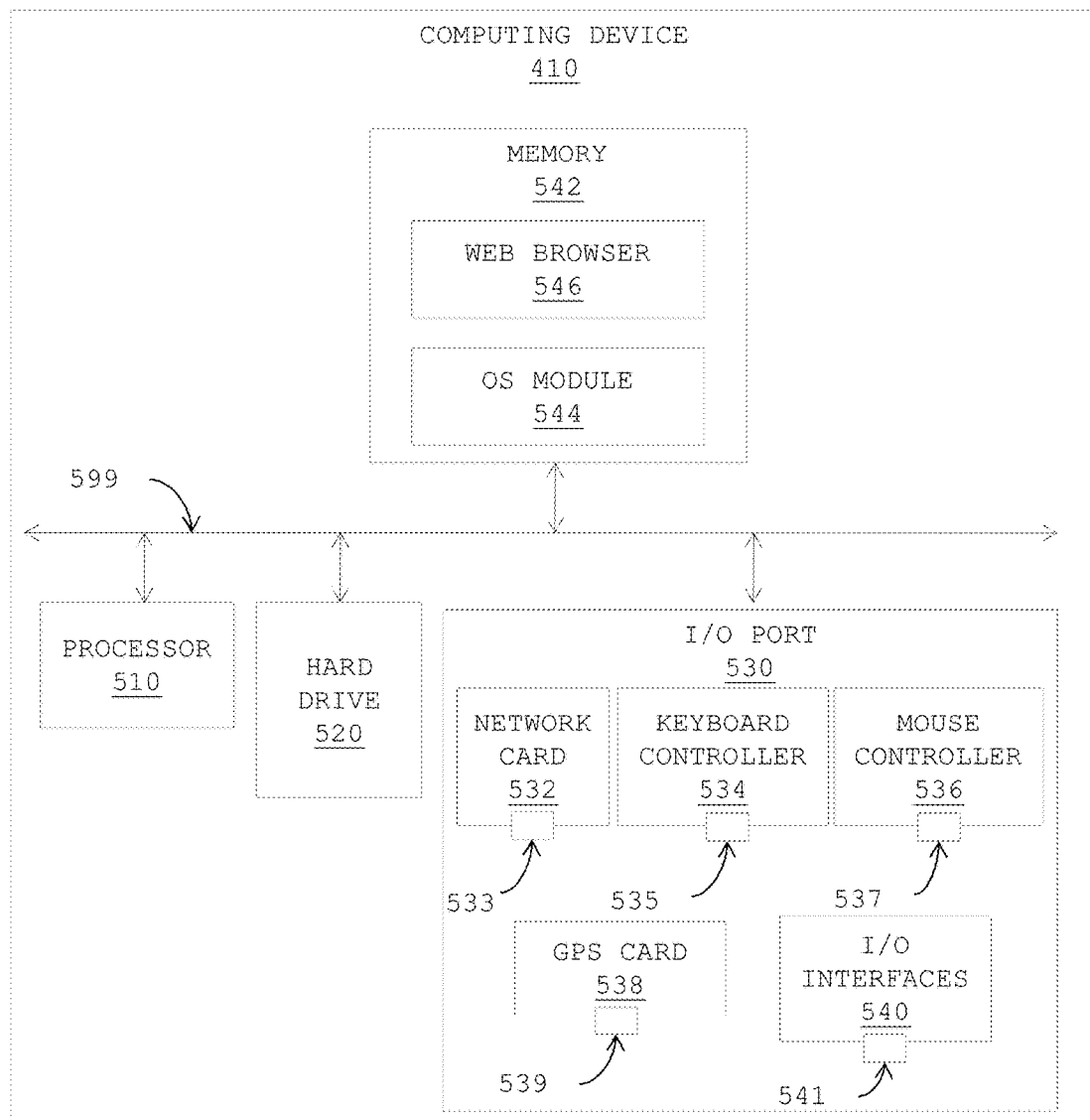
FIG. 5 is a block diagram illustrating an exemplary computing device, in accordance with one embodiment.

FIG. 5 is a block diagram illustrating an exemplary computing device, for example the computing device 410, in accordance with one embodiment.

The computing device 410 includes a processor 510, a hard drive 520, an I/O port 530, and a memory 542, coupled by a bus 599.

The bus 599 can be soldered to one or more motherboards. Examples of the processor 510 includes, but is not limited to, a general purpose processor, an application-specific integrated circuit (ASIC), an FPGA (Field Programmable Gate Array), a RISC (Reduced Instruction Set Controller) processor, or an integrated circuit. The processor 510 can be a single core or a multiple core processor. In one embodiment, the processor 510 is specially suited for processing demands of location-aware reminders (for example, custom micro-code, and instruction fetching, pipelining or cache sizes). The processor 510 can be disposed on silicon or any other suitable material. In operation, the processor 510 can receive and execute instructions and data stored in the memory 542 or the hard drive 520. The hard drive 520 can be a platter-based storage device, a flash drive, an external drive, a persistent memory device, or other types of memory.

The hard drive 520 provides persistent (long term) storage for instructions and data. The I/O port 530 is an input/output panel including a network card 532 with an interface 533 along with a keyboard controller 534, a mouse controller 536, a GPS card 538 and I/O interfaces 540. The network card 532 can be, for example, a wired networking card (e.g., a USB card, or an IEEE 802.3 card), a wireless networking card (e.g., an IEEE 802.11 card, or a Bluetooth card), and a cellular networking card (e.g., a 3G card). The interface 533 is configured according to networking compatibility. For example, a wired networking card includes a physical port to plug in a cord, and a wireless networking card includes an antennae. The network card 532 provides access to a communication channel on a network. The keyboard controller 534 can be coupled to a physical port 535 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 536 can also be coupled to a physical port 537 (for example, mouse or USB port). The GPS card 538 provides communication to GPS satellites operating in space to receive location data. An antenna 539 provides radio communications (or alternatively, a data port can receive location information from a peripheral device). The I/O interfaces 540 are user interfaces for example, touch interface in tablet devices. Further, the I/O interfaces 540 can be coupled to a physical port 541.

The memory 542 can be a RAM (Random Access Memory), a flash memory, a non-persistent memory device, or other devices capable of storing program instructions being executed. The memory 542 comprises an Operating System (OS) module 544 along with a web browser 546. In other embodiments, the memory 542 comprises a calendar application that manages a plurality of appointments. The OS module 544 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Many functionalities described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 802.11n). In one example, signals from the computer can be transferred, at least in part, wirelessly to components or other computers.

Figure 6:
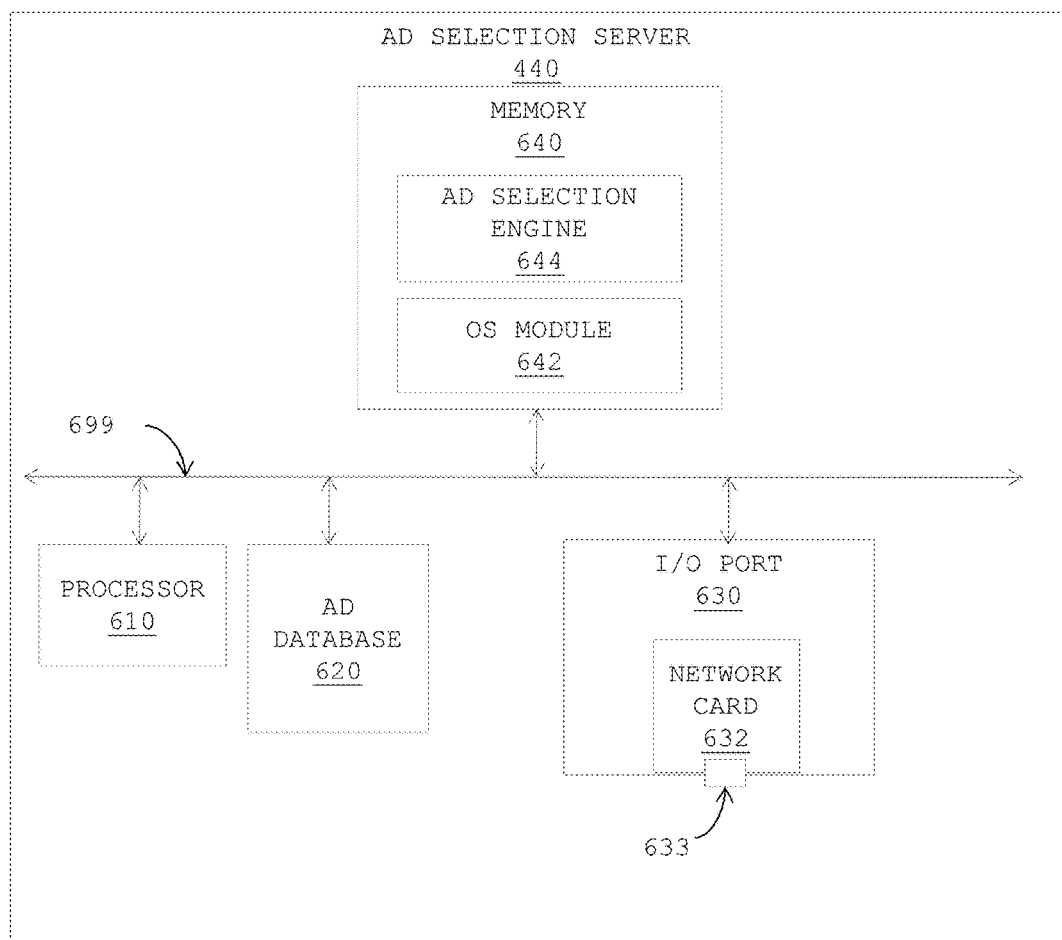
FIG. 6 is a block diagram illustrating an exemplary ad selection server, in accordance with one embodiment.

FIG. 6 is a block diagram illustrating an exemplary ad selection server 440, in accordance with one embodiment. The ad selection server 440 includes a processor 610, an ad database 620, an I/O port 630, and a memory 640, coupled by a bus 699. The processor 610, the advertisement database 620, and the I/O port 630 can be configured as described above with respect to FIG. 5.

The memory 640 comprises an OS module 642, as described above, along with an ad selection engine 644. The ad selection engine 644 can select an advertisement from the storage unit 430 of FIG. 4. The ad selection engine 644 is described in detail below.

Figure 7:
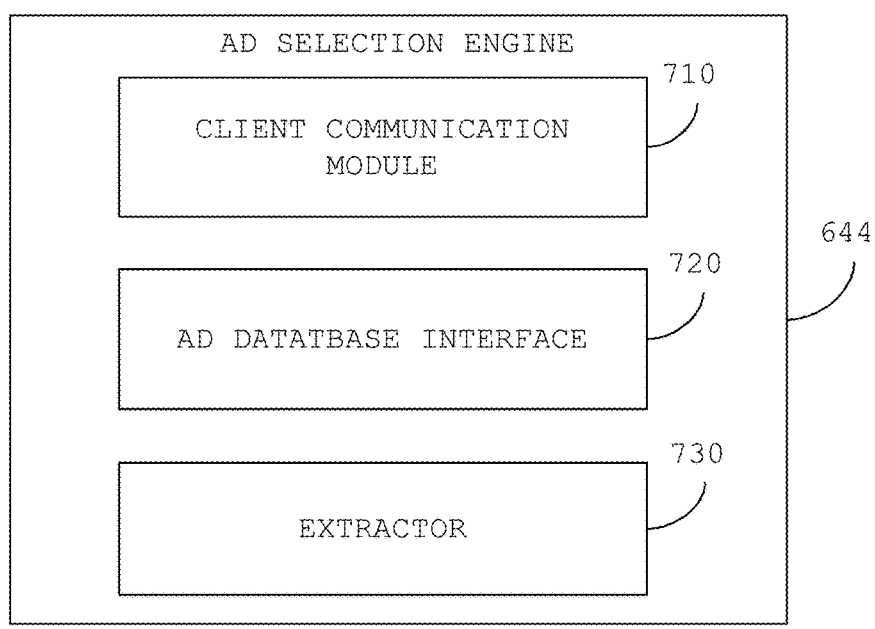
FIG. 7 is a block diagram illustrating an exemplary ad selection engine, in accordance with one embodiment.

FIG. 7 is a block diagram illustrating an exemplary ad selection engine 644, in accordance with one embodiment. The ad selection engine 644 includes components. The components include a client communication module 710, an ad database interface 720, and an extractor 730. The components can communicate with each other through, for example, APIs (Application Programming Interfaces). In other embodiments, all or parts of the components can be implemented in hardware or benefit from special hardware accelerators.

The client communication module 710 communicates with, for example, the computing device 410 (or an installed client) to receive meta data of hot-spots and send advertisements. The ad database interface 720 communicates with the storage unit 430 for searching advertisements and directing advertisements to be downloaded to clients. Further, the extractor 730 obtains URLs of relevant advertisements pertaining to the user interest.

Advantageously, an interactive contextual search is performed on annotated images during web browsing. Further, advertisements are placed on relevant parts of the annotated images. This results in increased CTRs for the advertisements. Furthermore, the interactive contextual search provides an interesting experience to the user.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented method comprising:
providing, using at least one processor, a digital image in a web page for display to a user at the user's computing device, the digital image annotated with metadata comprising one or more search terms and having one or more portions of the digital image designated as user-selectable hot-spots of the digital image, each of the digital image's one or more user-selectable hot-spots being associated with a respective region of the digital image and at least one associated search term from the digital image's metadata to be used as a search query to retrieve and display initial search results comprising additional information about the digital image's content in response to user selection of one of the digital image's user-selectable hot-spots;
tracking, using the at least one processor, one or more movements of a user input device in connection with the digital image's one or more user-selectable hot-spots;
receiving, using the at least one processor, selection input indicating a user-selected hot-spot of the digital image's one or more user-selectable hot-spots;
performing, using the at least one processor and in response to receiving the selection input indicating a user-selected hot-spot, a search using the metadata associated with the user-selected hot-spot to retrieve the initial search results comprising the additional information about the digital image's content;

in response to selection, by the user, of the user-selected hot-spot, providing, using the at least one processor, a pop-up comprising a graphical user interface that displays, after receiving the selection input and performing the search, the at least one search term that is associated with the user-selected hot-spot associated with the respective region of the digital image-and that is used as a search query to retrieve the initial search results displayed by the pop-up about the digital image's content in response to the user-selected hot-spot associated with the respective region of the digital image, in further response to the selection, by the user, of the user-selected hot-spot, the pop-up further comprising one or more suggested search terms associated with the user-selected hot-spot associated with the respective region of the digital image, the one or more suggested search terms being selectable by the user to change the search query and the search results that are displayed in response to the selection input indicating the user-selected hot-spot associated with the respective region of the digital image, the pop-up further comprising recommendations derived from a number of social networks of the user.

2. The computer-implemented method of claim 1 further comprising:
providing one or more relevant advertisements corresponding to the user-selected hot-spot of the digital image's one or more user-selectable hot-spots in response to receiving the selection input indicating the user-selected hot-spot, the providing further comprising retrieving a number of links, to a number of advertisements, from the metadata annotating the digital image and corresponding to the user-selected hot-spot, each retrieved link corresponding to an advertisement associated with the user-selected hot-spot, and selecting the one or more relevant advertisements corresponding to the user-selected hot-spot and targeted to the user from the number of advertisements.

3. The computer-implemented method of claim 1 further comprising:
retrieving, by the at least one processor and in response to receiving the selection input indicating the user-selected hot-spot of the digital image's one or more user-selectable hot-spots, the at least one associated search term for the search query from the associated metadata for the user-selected hot-spot of the digital image's one or more user-selectable hot-spots; and
retrieving, by the at least one processor and in response to receiving the selection input indicating the user-selected hot-spot of the digital image's one or more user-selectable hot-spots, one or more universal resource locators (URLs) from the associated metadata for the user-selected hot-spot of the digital image's one or more user-selectable hot-spots, the one or more URLs retrieved from the metadata corresponding to the user-selected hot-spot being associated with one or more advertisements displayed in the pop-up in response to receiving the selection input indicating a user-selected hot-spot.

4. The computer-implemented method of claim 1 further comprising:
storing the metadata annotating the digital image, the stored metadata annotating the digital image comprising the one or more search terms and a link to a contextual advertisement corresponding to the search query used to retrieve the initial search results.

5. The computer-implemented method of claim 1, further comprising:
linking each of the digital image's one or more user-selectable hot-spots with the at least one associated search term to be used as the search query to retrieve the initial search results and one or more relevant contextual advertisements corresponding to the search query.

6. The computer-implemented method of claim 1 further comprising:
analyzing, using the at least one computing device, the digital image prior to providing the digital image for display, the analyzing comprising:
scanning the digital image to identify the one or more portions of the digital image;
identifying each of the identified one or more portions of the scanned digital image as a hot-spot; and
associating metadata with each of the digital image's one or more user-selectable hot-spots, the metadata comprising the at least one associated search term and information identifying one or more advertisements.

7. The computer-implemented method of claim 6, wherein the one or more portions comprises at least one of facial features, cloths, devices, and ornaments.

8. A non-transitory computer-readable storage medium storing thereon computer-readable instructions that when executed by a processor, cause the processor to:
provide a digital image in a web page for display to a user at the user's computing device, the digital image annotated with metadata comprising one or more search terms and having one or more portions of the digital image designated as user-selectable hot-spots of the digital image, each of the digital image's one or more user-selectable hot-spots being associated with a respective region of the digital image and at least one associated search term from the digital image's metadata to be used as a search query to retrieve and display initial search results comprising additional information about the digital image's content in response to user selection of the digital image's user-selectable hot-spots;
track one or more movements of a user input device in connection with the digital image's one or more user-selectable hot-spots;
receive selection input indicating a user-selected hot-spot of the digital image's one or more user-selectable hot-spots;
perform, in response to receiving the selection input indicating a user-selected hot-spot, a search using the metadata associated with the user-selected hot-spot to retrieve the initial search results comprising the additional information about the digital image's content;
in response to selection, by the user, of the user-selected hot-spot, provide a pop-up comprising a graphical user interface that displays, after receiving the selection input and performing the search, the at least one search term that is associated with the user-selected hot-spot associated with the respective region of the digital image and that is used as a search query to retrieve the initial search results displayed by the pop-up about the digital image's content in response to the user-selected hot-spot associated with the respective region of the digital image, in further response to selection, by the user, of the user-selected hot-spot, the pop-up further comprising one or more suggested search terms associated with the user-selected hot-spot associated with the respective region of the digital image, the one or more suggested search terms being selectable by the user to change the search query and search results that are displayed in response to the selection input indicating the user-selected hot-spot associated with the respective region of the digital image, the pop-up further comprising recommendations derived from a number of social networks of the user.

9. The medium of claim 8, the instructions further comprising instructions to:
provide one or more advertisements relevant to the user-selected hot-spot of the digital image's one or more user-selectable hot-spots in response to receiving the selection input indicating the user-selected hot-spot, the providing further comprising retrieving a number of links, to a number of advertisements, from the metadata annotating the digital image and corresponding to the user-selected hot-spot, each retrieved link corresponding to an advertisement associated with the user-selected hot-spot, and selecting the one or more relevant advertisements corresponding to the user-selected hot-spot and targeted to the user from the number of advertisements.

10. The medium of claim 8, the instructions further comprising instructions to:
retrieve, in response to receiving the selection input indicating the user-selected hot-spot of the digital image's one or more user-selectable hot-spots, the at least one associated search term for the search query from the associated metadata for the user-selected hot-spot of the digital image's one or more user-selectable hot-spots; and
retrieve, in response to receiving the selection input indicating the user-selected hot-spot of the digital image's one or more user-selectable hot-spots, one or more universal resource locators (URLs) from the associated metadata for the user-selected hot-spot of the digital image's one or more user-selectable hot-spots, the one or more URLs retrieved from the metadata corresponding to the user-selected hot-spot being associated with the one or more advertisements displayed in the pop-up in response to receiving the selection input indicating a user-selected hot-spot.

11. The medium of claim 8, the instructions further comprising instructions to:
store the metadata annotating the digital image, the stored metadata annotating the digital image comprising the one or more search terms and a link to a contextual advertisement corresponding to the search query used to retrieve the initial search results.

12. The medium of claim 8, the instructions further comprising instructions to:
link each of the digital image's one or more user-selectable hot-spots with the at least one associated search term to be used as the search query to retrieve the initial search results and the one or more relevant contextual advertisements corresponding to the search query.

13. The medium of claim 8 further comprising:
analyze the digital image prior to providing the digital image for display, the analyzing comprising:
the digital image to identify the one or more portions of the digital images;
identify each of the identified one or more portions of the scanned digital image as a hot-spot; and
associate metadata with each of the digital image's one or more user-selectable hot-spots, the metadata comprising the at least one associated search term and information identifying one or more advertisements.

14. The medium of claim 13, wherein the one or more portions comprises at least one of facial features, cloths, devices, and ornaments.

15. A system comprising:
at least one computing device, each computing device comprising one or more processors and a storage medium for tangibly storing thereon program logic for execution by the one or more processors, the stored program logic comprising:
providing logic executed by the one or more processors for providing a digital image in a web page for display to a user at the user's computing device, the digital image annotated with metadata comprising one or more search terms and having one or more portions of the digital image designated as user-selectable hot-spots of the digital image, each of the digital image's one or more user-selectable hot-spots being associated with a respective region of the digital image and at least one associated search term from the digital image's metadata to be used as a search query to retrieve and display initial search results comprising additional information about the digital image's content in response to user selection of the digital image's user-selectable hot-spots;
tracking logic executed by the one or more processors for tracking one or more movements of a user input device in connection with the digital image's one or more user-selectable hot-spots;
receiving logic executed by the one or more processors for receiving selection input indicating a user-selected hot-spot of the digital image's one or more user-selectable hot-spots;
performing logic executed by the one or more processors for performing, in response to receiving the selection input indicating a user-selected hot-spot, a search using the metadata associated with the user-selected hot-spot to retrieve the initial search results comprising the additional information about the digital image's content;
providing logic executed by the one or more processors for providing, in response to selection, by the user, of the user-selected hot-spot, a pop-up comprising a graphical user interface that displays, after receiving the selection input and performing the search, the at least one search term that is associated with the user-selected hot-spot associated with the respective region of the digital image and that is used as a search query to retrieve the initial search results displayed by the pop-up about the digital image's content in response to the user-selected hot-spot associated with the respective region of the digital image, in further response to the selection, by the user, of the user-selected hot-spot, the pop-up further comprising one or more suggested search terms associated with the user-selected hot-spot associated with the respective region of the digital image, the one or more suggested search terms being selectable by the user to change the search query and the search results that are displayed in response to the selection input indicating the user-selected hot-spot associated with the respective region of the digital image, the pop-up further comprising recommendations derived from a number of social networks of the user.

16. The system of claim 15, the program logic for execution by the one or more processors further comprising:
providing logic executed by the one or more processors for providing one or more advertisements relevant to the user-selected hot-spot of the digital image's one or more user-selectable hot-spots in response to receiving the selection input indicating the user-selected hot-spot, the providing logic further comprising retrieving a number of links, to a number of advertisements, from the metadata annotating the digital image and corresponding to the user-selected hot-spot, each retrieved link corresponding to an advertisement associated with the user-selected hot-spot, and selecting the one or more relevant advertisements corresponding to the user-selected hot-spot and targeted to the user from the number of advertisements.

17. The system of claim 15, the program logic for execution by the one or more processors further comprising:
storing logic executed by the one or more processors for storing the metadata annotating the digital image, the stored metadata annotating the digital image comprising the one or more search terms and a link to a contextual advertisement corresponding to the search query used to retrieve the initial search results.

18. The system of claim 17, the program logic for execution by the one or more processors further comprising:
analyzing logic executed by the one or more processors for analyzing the digital image prior to providing the digital image for display, the analyzing logic comprising:
scanning logic executed by the one or more processors for scanning the digital image to identify the one or more portions of the digital image;
identifying logic executed by the one or more processors for identifying each of the identified one or more portions of the scanned digital image as a hot-spot; and
associating logic executed by the one or more processors for associating metadata with each of the digital image's one or more user-selectable hot-spots, the associated metadata comprising the at least one associated search term and information identifying one or more advertisements.

* * * * *